United States Patent
Wei

[19]

[11] Patent Number: 5,803,553
[45] Date of Patent: Sep. 8, 1998

[54] TWO PIECE VEHICLE WHEEL WITH MECHANICALLY LOCKED SECTIONS

[75] Inventor: Daniel C. Wei, Ann Arbor, Mich.

[73] Assignee: Hayes Lemmerz International, Inc., Romulus, Mich.

[21] Appl. No.: 902,181

[22] Filed: Jul. 29, 1997

Related U.S. Application Data

[63] Continuation of Ser. No. 569,824, Dec. 8, 1995, abandoned.

[51] Int. Cl.⁶ ...................................................... B60B 23/04
[52] U.S. Cl. .......................................... 301/63.1; 301/64.5
[58] Field of Search .................................. 301/17, 35.62, 301/63.1, 64.2, 64.5, 64.7, 65; 29/894.322

[56] References Cited

U.S. PATENT DOCUMENTS

| | | | |
|---|---|---|---|
| 1,478,437 | 12/1923 | Kaplan | 301/17 |
| 1,581,679 | 4/1926 | Cook | 301/17 |
| 1,688,146 | 10/1928 | Klaus | 301/63.1 |
| 3,117,369 | 1/1964 | Albert | 301/63.1 X |
| 3,506,311 | 4/1970 | Nobach . | |
| 3,612,614 | 10/1971 | Ware . | |
| 4,256,348 | 3/1981 | Lester et al. | 301/65 X |
| 4,363,347 | 12/1982 | Baumgartner . | |
| 4,518,204 | 5/1985 | Takada . | |
| 5,018,795 | 5/1991 | Engerand et al. . | |
| 5,257,455 | 11/1993 | Iwatsuki . | |
| 5,344,219 | 9/1994 | Adrian et al. . | |
| 5,421,642 | 6/1995 | Archibald . | |

FOREIGN PATENT DOCUMENTS

| | | | |
|---|---|---|---|
| 0 096 399 | 12/1983 | European Pat. Off. . | |
| 1189762 | 10/1959 | France | 301/63.1 |
| 3503882A1 | 8/1986 | Germany . | |
| 3630226 | 3/1987 | Germany | 301/65 |
| 59-32502 | 2/1984 | Japan . | |
| 95-237044 | 9/1995 | Japan . | |
| 895561 | 5/1962 | United Kingdom | 301/63.1 |

*Primary Examiner*—Russell D. Stormer
*Attorney, Agent, or Firm*—MacMillan, Sobanski & Todd, LLC

[57] ABSTRACT

A vehicle wheel having a wheel rim heat shrunk onto a wheel disc and mechanically secured to the wheel disc by an interlocking segmented grooves and beads, and a method for fabricating same. A resilient material including an adhesive is disposed between the wheel disc and the wheel rim. The adhesive bonds the wheel rim to the wheel disc while the resilient material forms air-tight seal therebetween.

24 Claims, 3 Drawing Sheets

TWO PIECE VEHICLE WHEEL WITH MECHANICALLY LOCKED SECTIONS

This application is a continuation of Ser. No. 08/569,824 filed on Dec. 8, 1995 and now abandoned.

BACKGROUND OF THE INVENTION

This invention relates in general to vehicle wheels and in particular to two piece wheels having a separately formed wheel rim mechanically locked to a wheel disc.

It is known in the art to fabricate a vehicle wheel by attaching a wheel rim to a separately formed wheel disc. Typically, the wheel rim is rolled from steel strip stock and the disc is stamped from steel sheet stock. The rim is welded to the disc to form the wheel. Such a wheel is shown in U.S. Pat. No. 5,257,455 to Iwatsuki. Alternately, the wheel rim can be rolled from steel and the wheel disc cast or forged from a light weight metal, such as aluminum, titanium or magnesium, or an alloy of a light weight metal. Because the metals forming the rim and disc are different, a ferrous weld anchor is usually attached to wheel disc. The wheel rim is welded to the weld anchor to assure that a good weld is formed between the rim and disc. Such a wheel is described in U.S. Pat. No. 3,506,311 to Nobach and is commonly referred to a bimetal wheel. A bimetal wheel combines the economy, flexibility and strength of a steel rim with the pleasing ornamental appearance of three dimensional contours formed in a cast or forged wheel disc.

To enhance the appearance of a two piece wheel, it is known to attach a full face wheel disc which includes the outboard tire retaining flange to a partial wheel rim to form a full face bimetal wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Referring now to the drawings, there is shown in FIG. 1 a fragmentary sectional view of a typical prior art bimetal full face wheel 10. The wheel 10 is described in the Nobach patent listed above and includes a full face wheel disc 11 formed from a light weight metal or light weight metal alloy by a conventional process, such as gravity, low pressure or die casting. The full face wheel disc 11 includes a central wheel hub 12 which is supported by a plurality of wheel spokes 13 (one shown) within an annular sidewall 14. An outboard tire bead retaining flange 15 extends in a radial outward direction from the sidewall 14. The wheel disc 11 also includes a ring-shaped weld anchor 16 formed from a ferrous material, such as steel, which is partially embedded in the wheel disc sidewall 14. A portion of the weld anchor 16 is exposed to form a welding surface 17. The sidewall 14 further includes a cylindrically-shaped collar 18 which extends axially from the inboard side of the flange 15. The collar 18 extends radially over a portion of the weld anchor 16 to secure the weld anchor 16 to the wheel disc 11.

A conventional partial wheel rim 20 is attached to the inboard side of the wheel disc 11. The wheel rim 20 is formed from steel strip stock with conventional rim roll forming machinery. The wheel rim 20 includes an inboard end 21 which terminates in a conventional inboard tire bead retaining flange 22. An inboard tire bead seat 23 and inboard safety bead 23A are also formed on the inboard end 21 of the wheel rim 20. A leg portion 24 extends in an outward axial direction from the inboard safety bead 23A. A deepwell 25 is formed in the wheel rim 20 adjacent to the leg portion 24. The wheel rim 20 also includes a cylindrically-shaped outboard end 26 which is adjacent to the deepwell 25. The outboard wheel rim end 26 includes an outboard tire bead seat 27 and outboard safety bead 27A. The outboard rim end 26 extends over the wheel disc collar 18 and into contact with the welding surface 17 of the weld anchor 15. The outboard rim end 26 and the wheel disc collar 18 are sized to form a clearance fit therebetween, allowing the wheel rim 20 to be rotated relative to the wheel disc 11.

A continuous circumferential air-tight weld 28 is formed between the wheel rim 20 and the weld anchor 16. Typically, a conventional friction or inertial welding process is used to form the weld 28. During the welding process, the wheel disc 11 is held stationary while the wheel rim 20 is rotated with the outboard rim end 23 pressed against the weld anchor 16. The heat generated by friction partially melts the outboard wheel rim end 26 and the adjacent portion of the weld anchor 16 to form the weld 28.

An alternate structure for the weld anchor is disclosed in U.S. Pat. No. 5,421,642 to Archibald where the weld anchor includes an annular collar which is received by the outboard end of a partial wheel rim. The weld anchor collar positions the wheel rim on the wheel disc.

While the wheel disc is typically welded to the wheel rim, it is also known to heat shrink the wheel rim onto the wheel disc, as shown in U.S. Pat. No. 4,363,347 to Baumgartner and European Patent Application No. 0 096 399 to Stahlschmidt & Malwurm GmbH & Co. KG. The U.S. patent discloses wheel structures having either cylindrical or conical shrinkage surfaces. The U.S. patent also discloses optional cutting or rolling of threads on the cylindrical shrinkage surfaces to allow the disc to be threadedly attached to the wheel rim. The European Patent Application discloses conical shrinkage surfaces. The European Patent Application further discloses optional forming of cleats and corresponding grooves, which receive the cleats, on the shrinkage surfaces.

SUMMARY OF THE INVENTION

This invention relates to a two piece vehicle wheel having a wheel rim mechanically secured to a wheel disc by interlocking segmented beads and grooves, and a method for fabricating same.

As described above, two piece vehicle wheels typically include a wheel disc welded to a wheel rim which is formed by a rolling or spinning operation. The heat of welding has been know to warp the wheel disc and/or the wheel rim. Also, a layer of oxidized metal can form on the welding surface of the wheel disc and on the adjoining surface of the partial wheel rim. This layer of oxidized metal can prevent formation of a satisfactory weld between the wheel disc and wheel rim. When a partial wheel rim is welded to a full face wheel disc, oxidation on the welding surface can prevent formation of an air-tight weld between the wheel rim and the wheel disc. As a result, tire inflation air may leak from a tire mounted upon the assembled full face wheel. Additional metal oxidization can occur if the wheel disc is subjected to a plating process to form a decorative layer on the visible portion of the wheel disc.

The heat generated by the welding operation used to attach the wheel rim to the wheel disc can damage the decorative finish of the wheel disc. If the wheel finish is flawed, the entire wheel must be scrapped. It is known to delay applying the decorative finish to the wheel disc until after the wheel is welded; however, this requires a more complex manufacturing process. Thus, it would be desirable to fabricate two piece wheels without a welding operation. This would eliminate the potential of heat damage to the wheel, allow application of the decorative finish to the wheel disc before assembly of the wheel and reduce the scrap rate for assembled wheels.

The present invention contemplates a two piece wheel including an annular wheel rim having an outboard end, the outboard end defining a cylindrical inner surface, and a circular wheel disc which extends across said outboard end of the wheel rim. The wheel disc has a central hub connected by a plurality of spokes to an annular-shaped sidewall. The sidewall includes a cylindrical outer surface which extends axially into the wheel rim outboard end adjacent to the inner cylindrical surface.

A mechanical coupling secures the wheel rim to the wheel disc. The coupling includes at least one segmented bead formed on the wheel disc outer cylindrical surface and at least one segmented groove formed in wheel rim inner cylindrical surface. Alternately, the segmented bead can be formed on the wheel rim inner cylindrical surface and the segmented groove formed in the wheel disc outer cylindrical surface. The groove segments are complementary to the beads segments. The groove segments receive the bead segments and cooperate therewith to retain the wheel disc within the wheel rim.

The invention further contemplates that the coupling can include a plurality of parallel segmented beads and grooves. The groove segments are complementary to the bead segments and cooperate therewith to retain the wheel disc within the wheel rim. The invention also contemplates that the segmented beads and grooves define a plurality of parallel planes with the bead segments in at least one of the parallel planes can be staggered relative to the bead segments in the other parallel planes.

A resilient material can be disposed between the wheel rim and wheel disc to form an air-tight seal therebetween. An adhesive can be included in the resilient material to secure the wheel disc to the wheel rim. Alternately, the wheel disc can be brazed, welded or soldered to the wheel rim.

The invention also contemplates a process for fabricating the vehicle wheel described above. The process includes providing a wheel disc which includes a cylindrical outer surface having at least one segmented beads formed thereon and a wheel rim having at least one segmented groove formed on a cylindrical inner surface. Alternately, the segmented bead can be formed on the wheel rim inner cylindrical surface and the segmented groove formed in the wheel disc outer cylindrical surface. The groove segments are complementary to the bead segments.

The outboard end of the wheel rim is heated to radially expand the inside diameter thereof sufficiently to fit over bead formed on the wheel disc. The expanded wheel rim is positioned over the wheel disc with the outboard rim end extending axially over the cylindrical outer surface of the wheel disc and with the groove segments aligned with the bead segments. The resulting wheel assembly is cooled to shrink fit the wheel rim onto the wheel disc. As the wheel rim contracts, the groove segments receive the corresponding bead segments to retain the wheel rim within the wheel disc.

A resilient material can be applied to the wheel disc before the heated wheel rim is positioned over the wheel disc and sealing material. As the wheel rim cools and contracts, the resilient material is compressed to form an air-tight seal between the wheel rim and wheel disc. To further secure the wheel rim to the wheel disc, an adhesive can be included in the sealing material. Alternately, an air-tight seal can be formed by welding, brazing or soldering the wheel rim to the wheel disc.

Additionally, the wheel disc can have a plurality of segmented beads formed on the cylindrical outer surface and the wheel rim can have a plurality of complementary segmented grooves formed in the cylindrical inner surface. The groove segments receive corresponding bead segments and cooperate therewith to mechanically lock the rim on the disc. Furthermore, the bead segments of at least one of the segmented beads can be staggered relative to the other segmented beads.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
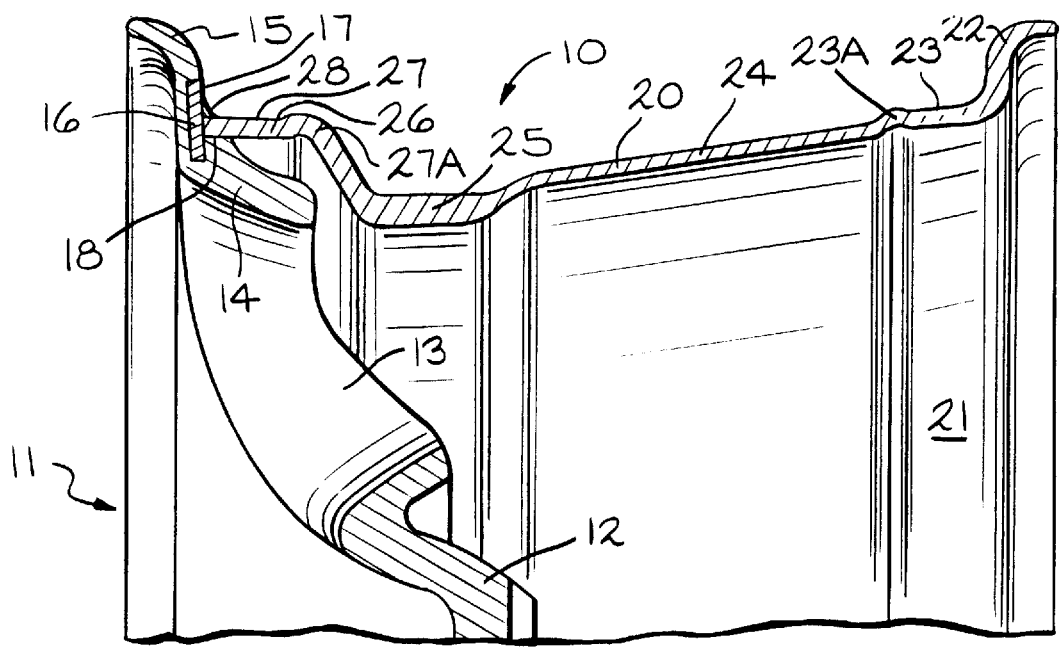
FIG. 1 is a fragmentary sectional view of a prior art two piece wheel.
Figure 2:
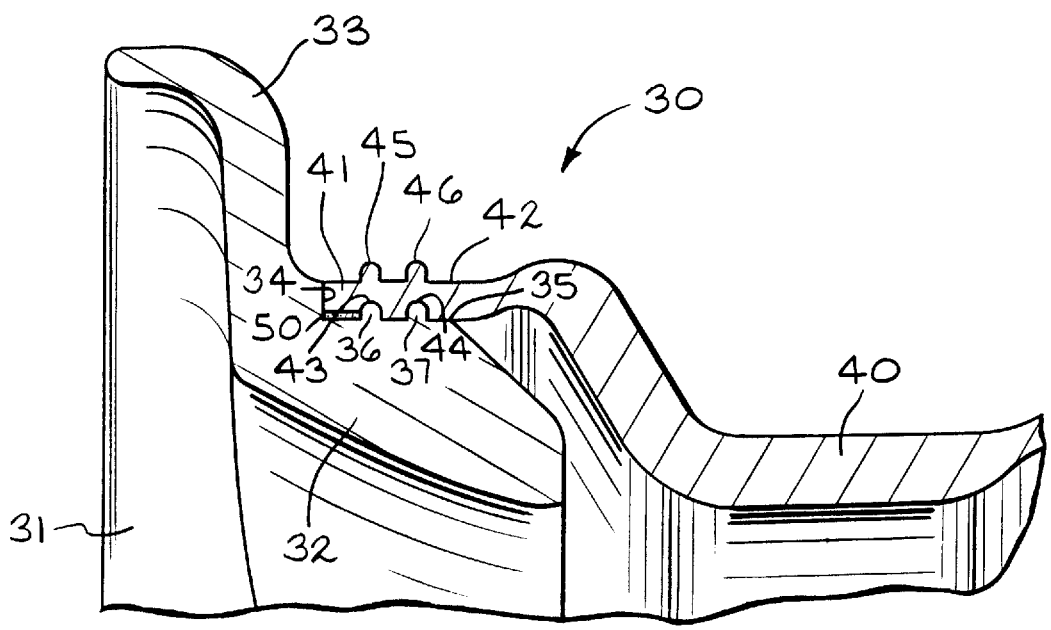
FIG. 2 is a fragmentary sectional view of a two piece wheel in accordance with the invention.

Referring again to the drawings, there is illustrated in FIG. 2 a fragmentary sectional view of a two piece wheel 30. In the preferred embodiment, the wheel 30 is a bimetal wheel which includes a full face wheel disc 31 formed from a light weight metal, such as aluminum, titanium or magnesium, or an alloy of a light weight metal, by a conventional process, such as casting or forging. While the preferred embodiment includes a wheel disc formed from a light weight metal, it will be appreciated that the wheel disc also can be stamped or forged from steel or stainless steel or formed from a plastic. Additionally, the wheel disc can be cast from stainless steel with the Hitchner process. In the preferred embodiment, the wheel disc 31 includes a decorative surface finish (not shown). For example, a layer of plating, such as chrome plating, can be deposited upon a portion of the wheel disc surface, or a layer of paint or a clear coating can be applied to the wheel disc 31.

While the preferred embodiment is described below for a bimetal wheel, it will be appreciated that the invention also can be practiced on a wheel having a disc and rim formed from the same metal, different alloys of the same metal or plastics. For example, a wheel rim formed from a first alloy of aluminum can be attached to a wheel disc formed from a second alloy of aluminum, where the second alloy of aluminum is different from the first alloy of aluminum.

As shown in FIG. 2, the wheel disc 31 includes an annular-shaped sidewall 32. An outboard tire bead retaining flange 33 extends in an outward radial direction from the sidewall 32. The inboard portion of the sidewall 32 has a reduced outer radius which forms a shoulder 34 and an annular collar 35. The collar 35 has a generally cylindrical outer surface which extends axially from the shoulder 34 toward the inboard end of the wheel 30.

Figure 3:
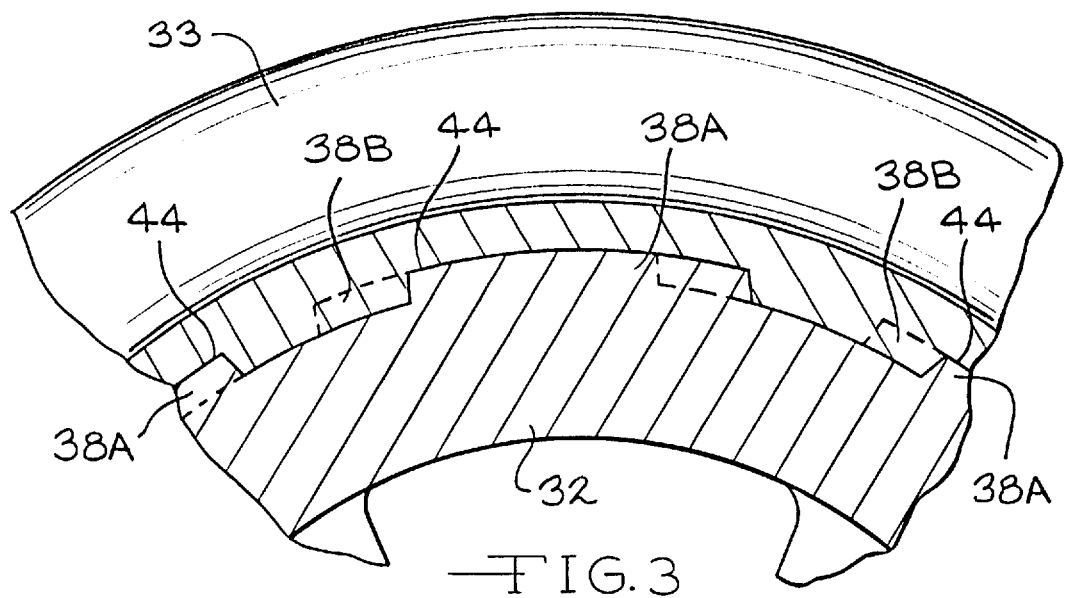
FIG. 3 is a fragmentary sectional view taken along line 3—3 in FIG. 2.

A plurality of circumferential beads, two of which, 38A and 38B, are shown in FIG. 2, are formed on the outer surface of the collar 35. The beads 38A and 38B are contained in parallel planes which are spaced apart axially and are perpendicular to the axis of the wheel 30. Each of the beads 38A and 38B consists of a plurality of discrete segments, as shown in FIG. 3, which are equally spaced about the circumference of the collar 35. While two beads 38A and 38B are shown, the invention also can be practiced with more than two beads or with a single bead formed on the outer surface of the collar 35. In the preferred embodiment, the bead segments in each plane are rotated relative to the bead segments contained in the other planes to stagger the bead segments. This is illustrated in FIG. 3, where the offset of the outboard bead segments 38B behind the inboard bead segments 38A is shown with phantom lines.

A conventional wheel rim 40, which in the preferred embodiment is a partial wheel rim, is attached to the wheel disc 31. The wheel rim 40 is formed from steel strip stock with conventional rim roll forming machinery; however, it will be appreciated that the wheel rim 40 also can be formed with a casting or forging process. Additionally, the wheel rim 40 can be formed from a light weight metal, such as aluminum, titanium or magnesium, an alloy of a light weight metal, a plastic or stainless steel. The wheel rim 40 can optionally include a decorative finish (not shown). For example, a layer of plating, such as chrome plating, can be deposited upon a portion of the wheel rim surface, or a layer of paint or a clear coating can be applied to the wheel rim 40.

The wheel rim 40 has a cylindrical outboard end 41 which includes a portion of an outboard tire bead seat 42. A plurality of parallel circumferential grooves 44 are formed in the cylindrical inner surface of the wheel rim end 41.

The grooves 44 are contained in parallel planes which are spaced apart axially and coincide with the planes of the beads 38A and 38B. Each of the grooves has a cross sectional shape which is complementary to the cross sectional shape of a corresponding bead on the wheel disc collar 35. Accordingly, as shown in FIG. 3, each of the grooves 44 consists of a plurality of discrete segments which are equally spaced about the circumference of the inner surface of the wheel rim end 41. Additionally, the grooves 44 in each plane are rotated relative to the grooves in the other planes to stagger the grooves to coincide with the pattern of the corresponding beads 38A and 38B. If the wheel disc collar 35 includes a single bead, a corresponding single bead is formed in the inner surface of the wheel rim end 41.

The grooves 44 are formed by a conventional process, such as stamping.

If the wheel rim 40 is cast, the grooves 44 can be formed during the casting operation. The grooves 44 also can be machined into the surface of the wheel rim end 41 to assure that the cross sectional shape of the grooves 44 complement the cross sectional shape of the beads 38. However, machining is usually an expensive operation and would be used only if required by the specific structure of the wheel 30.

The outboard wheel rim end 41 extends axially over the wheel disc collar 35 and contacts the wheel disc shoulder 34. The grooves 44 formed in the wheel rim end 41 receive the wheel disc beads 38A and 38B and cooperate therewith to prevent axial movement of the wheel rim 40 relative to the wheel disc 31. Thus, the grooves 44 and beads 38A and 38B mechanically lock the wheel rim 40 on the wheel disc collar 36: Additionally, the discrete bead and groove segments cooperate to prevent rotation of the wheel rim 40 about the wheel axis relative to the wheel disc 31.

A circumferential air-tight seal 45 is disposed between the wheel disc collar 35 and the wheel rim end 41 to prevent leakage of tire inflation air through the joint formed therebetween. The seal 45 is shown extending axially from the sidewall shoulder 34 to the outboard bead 38B formed on the collar 35. However, the seal 45 also may be disposed between the outboard and inboard beads 38B and 38A, between the inboard bead 38A and the inboard end of the collar 35 or over the entire surface of the collar 35. In the preferred embodiment, the seal 45 is formed from a resilient material. Also in the preferred embodiment, the resilient material forming the seal 45 includes an adhesive, such as an epoxy, acrylic or bisphenol. Such adhesives have high shear strength and toughness to resist impact and riser stresses. The adhesive functions to bond, and thereby further secure, the wheel disc 32 to the wheel rim 40.

Figure 4:
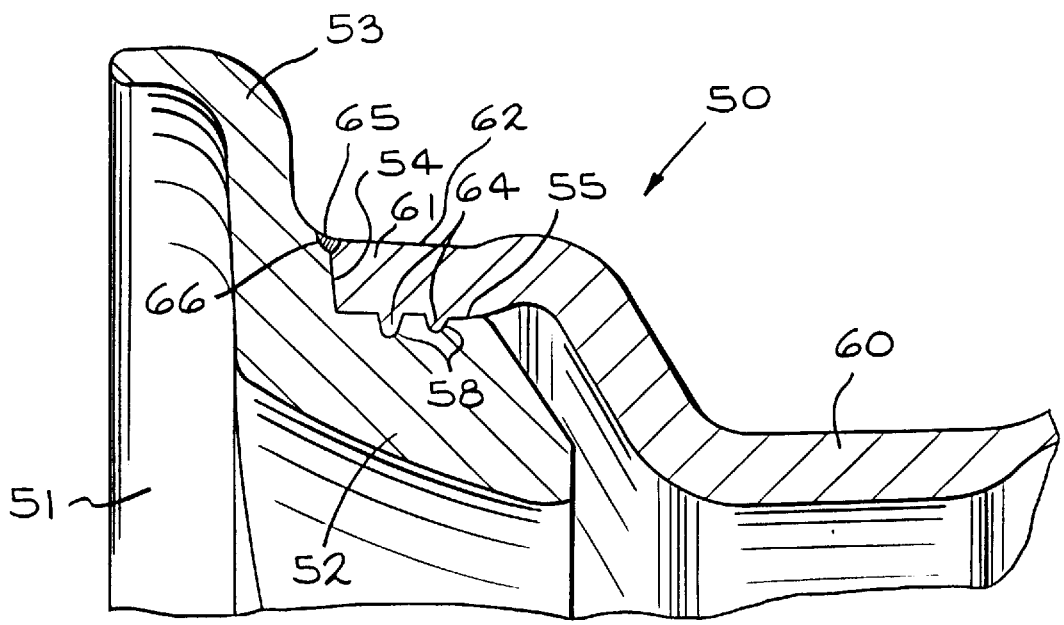
FIG. 4 is an alternate embodiment of the wheel shown in FIG. 2.

It will be appreciated that, while the preferred embodiment has been illustrated in FIG. 2 with the beads 38A and 38B formed on the wheel disc collar 35 and the grooves 44 formed in the wheel rim end 41, the invention also can be practiced with a plurality of segmented beads formed on the inner surface of the rim end 41 which are received in corresponding segmented grooves formed in the outer surface of the wheel disc collar 35, as illustrated in FIG. 4. Additionally, while the beads 38A and 38B and grooves 44 have been shown in FIG. 2 having generally rounded cross-sectional shapes, the invention also can be practiced with beads and grooves having other cross-sectional shapes, such as, square, rectangular, elliptical, trapezoidal or triangular.

An alternate embodiment of the invention contemplates brazing the wheel rim 40 to the wheel disc 31. Accordingly, the seal 45 can be formed from a brazing filler metal. As will be described below, when a brazing filler metal is used, the joint between the wheel disc and the wheel rim is heated sufficiently during fabrication of the wheel to melt the filler metal. Upon cooling the filler metal secures the wheel rim 40 to the wheel disc 31 and forms an air-tight seal therebetween.

Another alternate embodiment of the invention is illustrated in FIG. 4, where a fragmentary sectional view of a wheel is shown generally at 50. Similar to the wheel 30 described above, the preferred embodiment of the wheel 50 includes a full face wheel disc 51 which has an annular-shaped sidewall 52. An outboard tire bead retaining flange 53 extends in an outward radial direction from the sidewall 52. The inboard end of the sidewall 52 has a reduced outer radius which forms a shoulder 54 and a cylindrical collar 55. The collar 55 extends axially from the shoulder 54 toward the inboard end of the wheel 50.

Circumferential parallel grooves 58 are formed in the outer surface of the collar 55. The grooves 58 are contained in parallel planes which are spaced apart axially and which are parallel to the shoulder 54. Each of the grooves 58 consists of discrete segments which are equally spaced about the circumference of the collar 55. While two grooves 58 are shown, the invention also can be practiced with more than two grooves or with a single groove (not shown) formed in the collar 55.

A wheel rim 60, which in the preferred embodiment is a partial wheel rim, is attached to the wheel disc 51. The wheel rim 60 has a cylindrically-shaped outboard end 61 which includes a portion of an outboard tire bead seat 62. A plurality of parallel circumferential beads 64 are formed on an inner surface 63 of the outboard end 61. As in the wheel 30 described above, each of the beads 64 is complementary to a groove 58 in the wheel disc collar 55. Thus, in the preferred embodiment, each of the beads 64 consists of a plurality of discrete segments. The wheel rim outboard end 61 extends axially over the wheel disc collar 55 and contacts the wheel disc shoulder 54. The beads 64 formed on the wheel rim end 61 are received by the wheel disc grooves 58 and cooperate therewith to mechanically lock the wheel rim 60 on the wheel disc collar 56. Additionally, the discrete bead and groove segments cooperate to prevent rotation of the wheel rim 60 relative to the wheel disc 51.

An air-tight continuous air-tight circumferential weld 65 secures the wheel rim 60 to the wheel disc 51. The weld is disposed in a circumferential groove 66 formed between the outboard wheel rim end 61 and the wheel disc shoulder 54. In the preferred embodiment, the weld 65 is formed by a conventional welding process. Typically, the groove 66 is formed during the welding process. The weld secures the wheel disc 51 to the wheel rim 60 while preventing loss of tire inflation air though the joint formed therebetween. Because the weld 65 is air-tight, it is not necessary to include sealing material between the wheel disc collar 55 and the wheel rim end 61. Alternately, the weld 65 can be formed on the inside of the wheel rim 60 between the inboard end of the wheel disc collar 55 and the wheel rim inner surface 63 (not shown).

The seal 65 also can be formed by soldering the wheel rim 60 to the wheel disc 60. During the soldering process, capillary action draws molten solder between the wheel rim end 61 and the wheel disc shoulder 54 to form an air-tight but joint. Similarly, an air-tight lap solder joint (not shown) can be formed between the surface of the wheel disc collar 55 and the inner surface 63 of the wheel rim end 61. Upon cooling, the solder secures the wheel disc 51 to the wheel rim 60 while preventing loss of tire inflation air.

While the wheel 50 has been illustrated in FIG. 4 as having the beads 64 formed on the wheel rim end 61 and grooves 58 formed in the wheel disc collar 55, it will be appreciated that the wheel 50 also can be formed with the beads formed on the wheel disc collar 55 and the corresponding grooves formed in the wheel rim end 61. While the preferred embodiments of the invention have been illustrated above with the wheel rim and disc joined in the area of the outboard tire bead seat, it will be appreciated that the invention also can be practiced with the wheel rim and disc joined in the area of the wheel deep well. Additionally, the invention can be practiced to provide a mechanical coupling between a wheel disc or spider which is disposed within a full wheel rim.

Figure 5:
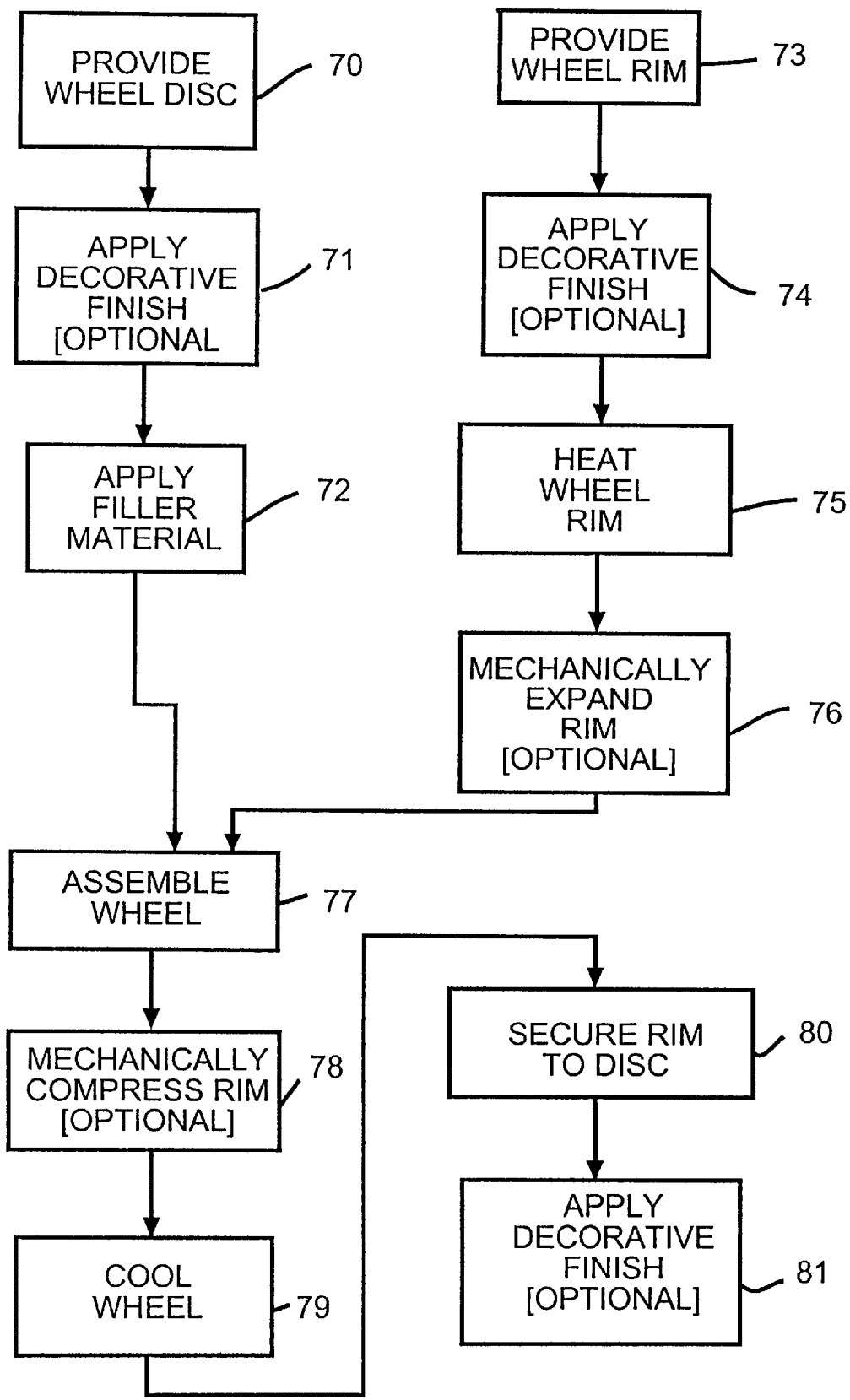
FIG. 5 is a flow chart for a process for fabricating the wheel shown in FIGS. 2 through 4.

The invention also contemplates a process for fabricating each of the wheels described above. A flow chart is shown in FIG. 5 for fabricating the wheels 30 and 50 illustrated in FIGS. 2 through 4. A wheel disc which includes an annular collar having a cylindrical outer surface is provided in functional block 70. In the preferred embodiment, a full face wheel disc is used with the collar extending axially from the inboard surface thereof. However, it will be appreciated that the process also can be practiced upon a wheel disc or spider which is disposed within a full wheel rim. A plurality of parallel segmented beads are formed on the cylindrical outer surface of the wheel disc collar.

In the preferred embodiment, a decorative finish is applied to a portion of the wheel disc surface in functional block 71; however, this step is optional. The coating can be a layer of paint or clear coat. Alternately, a decorative layer of plating can be deposited onto a portion of the wheel disc surface. Such layers of plating are typically sealed with a layer of clear coat. If the wheel rim is to be brazed, welded or soldered to the wheel disc, functional block 71 is omitted to preclude heat damage to the decorative coating or plating.

In functional block 72, a filler material, which in the preferred embodiment is a sealing material, is applied around the circumference of the wheel disc collar. As described above, in the preferred embodiment, the resilient material can include an adhesive. The sealing material can be applied continuously around the collar or in a series of discrete segments. The sealing material can be formed as a self-adhering tape or as a semi-solid material which is sprayed or rolled onto the wheel disc collar. When a semi-solid material is used, the material can be applied as a plurality of beads or as a continuous layer. The amount of sealing material applied and method of application is determined by the specific structures of the wheel disc and rim and the characteristics of the sealing material used.

If the wheel rim is to be brazed to the wheel disc, brazing filler metal is applied to the surface of the collar in functional block 72. Filler metal is typically a composition formed from several metals. The particular filler metal is selected to be compatible with the metals forming the wheel disc and the wheel rim. For example, to braze a steel wheel rim to an aluminum alloy wheel disk, a filler metal consisting mainly of copper or copper and zinc can be used. The filler metal can be in any conventional form, such as, foil, wire or paste. Alternately, a layer of filler material can be plated onto the wheel disc collar. Flux may be required for the specific metals being brazed and the filler metal selected. If required, the surface of the wheel disc collar is coated with flux before the filler metal is applied and additional flux is applied to the outer surface of the filler metal.

As explained above, if the wheel rim is welded or soldered to the wheel disc, an air tight weld or solder joint is formed therebetween. Accordingly, sealing material is not needed between the wheel disc and rim and the step shown in functional block 72 can be omitted.

A wheel rim, which in the preferred embodiment is a partial wheel rim, is provided in functional block 73. The wheel rim has a cylindrical outboard end which is sized to form an interference fit over the wheel disc collar. The outboard end has a cylindrical inner surface which has a plurality of parallel segmented grooves formed therein. Each of the groove segments correspond to one of bead segments formed on the wheel disc.

In the preferred embodiment, a decorative finish is applied to a portion of the wheel rim surface in functional block 74; however, this step is optional. The coating can be a layer of paint or clear coat. Additionally, a decorative layer of plating can be deposited onto a portion of the wheel rim surface. Such layers of plating are typically sealed with a layer of clear coat. If the wheel rim is to be brazed, welded or soldered to the wheel disc, functional block 74 is omitted to preclude heat damage to the decorative coating or plating.

In functional block 75, the outboard end of the wheel rim is heated by a conventional means, such as electric induction, electric resistance, or infrared heating elements or by placing the wheel rim in a gas-fired or electric resistance furnace. The wheel rim is heated until the inboard end has expanded sufficiently to clear the beads formed on the wheel disc when the wheel rim is assembled onto the wheel disc collar. While the final temperature of the wheel rim end will vary depending upon the material used to form the wheel rim, a temperature of approximately 400° F. (204° C.), or less, is typically sufficient. The final temperature is selected to not cause damage to any decorative finish which has been applied to the wheel disc and wheel rim.

As described above, the wheel rim can optionally be formed from a plastic. Generally, plastic becomes pliable when heated but does not expand sufficiently to clear the wheel disc beads. Accordingly, as an optional step for plastic wheel rims, the outboard end of the wheel rim is expanded radially in functional block 76 by a first mechanical means. The first mechanical means applies force to the inside surface of the wheel rim to expand the outboard end to a larger diameter. The expansion is applied equally about the circumference of the wheel rim to maintain the circularity thereof. The inside diameter of the wheel rim end is expanded sufficiently to clear the beads formed on the wheel disc collar.

In functional block 77, the wheel is assembled by positioning the cylindrical outboard end of the heated wheel rim extending axially over the cylindrical wheel disc collar with the grooves formed in the wheel rim end aligned with the beads formed in the wheel disc collar. The wheel is assembled with the rim concentric with the wheel disc and the inboard tire retaining flange parallel to the outboard tire retaining flange. The wheel rim and disc can optionally be placed in a fixture (not shown) to assure proper alignment therebetween.

For plastic wheel rims, a second mechanical means applies a force to the outside of the rim end, as shown in functional block 78, while the wheel rim end is still sufficiently heated to be pliable. The applied force compresses the outboard end of the wheel rim against the wheel disc collar. The second mechanical means forces the grooves formed in the wheel rim over the beads formed on the wheel disc collar to mechanically lock the wheel rim onto the wheel disc while compressing the sealing material therebetween. Because functional block 78 only applies to plastic wheel rims, it is shown as an optional step in FIG. 7.

The wheel rim is cooled in functional block 79. When a metal wheel rim is used, this step allows the wheel rim end to heat shrink onto the wheel disc collar. The outboard end of the wheel rim contracts as the wheel rim cools, forcing the wheel rim grooves over the wheel disc beads. As described above, the beads cooperate with the grooves to mechanically lock the wheel rim on the wheel disc. As the wheel rim end contracts any filler material is compressed between the wheel rim and the wheel disc. As described above, in the preferred embodiment, the filler material is resilient and can include an adhesive. Compression of resilient material provides an air-tight seal between the wheel disc and the wheel rim. In the preferred embodiment, the sealing material is applied as a plurality of beads which are spread to form a continuous layer. This precludes excess sealing material being squeezed out of the joint as the wheel rim end contracts.

The wheel disc is secured to the wheel rim in functional block 80. In the preferred embodiment, this includes curing of any adhesive included in the sealing material.

Alternately, a conventional brazing process can be utilized in functional block 80 to secure the wheel rim to the wheel disc. The joint between the wheel disc and wheel rim is heated to the brazing temperature by a conventional means, such as batch heating in a brazing furnace or localized heating with infrared heating elements. The brazing temperature is typically greater than 840° F. (450° C.) and is sufficient to melt the filler metal but not to melt the metals forming the wheel rim and the wheel disc. As the wheel joint cools, the filler metal solidifies and anchors the wheel rim to the wheel disc by metallurgical reaction and atomic bonding. Because the metals forming the wheel disc and the wheel rim are not melted, it does not matter if they have different melting points. Thus, steel can be brazed to aluminum as easily as to another steel. The filler metal also completely fills the joint to form an air-tight seal between the wheel rim and the wheel disc.

The present invention further contemplates using a low temperature brazing process to secure an aluminum alloy wheel rim to an aluminum alloy wheel disc.

A conventional welding process also can be utilized in functional block 80 to secure the wheel rim to the wheel disc. For such welded wheels, a continuous air-tight circumferential weld is formed between the wheel rim and the wheel disc in functional block 80.

Additionally, a conventional soldering process can be utilized in functional block 80 to secure the wheel rim to the wheel disc. In the preferred embodiment, a soldering filler metal is placed in the circumferential groove formed between the wheel collar shoulder and the end of the wheel rim. The filler metal is selected for the specific metals being soldered, for example, to solder an aluminum alloy wheel disc to a steel wheel rim, filler metal consisting of 98% zinc and 2% aluminum can be used. Flux may be required for the specific metals being soldered and the filler metal selected. If required, flux is applied to the joint before the filler metal is placed. Heat is then applied to the joint by a conventional means, such as a torch. Alternately, heat can be applied to the wheel to preheat the joint without any soldering filler metal being present. Soldering filler metal and flux are then supplied to the joint while heating is continued.

During the soldering process, capillary action draws molten soldering filler metal between the wheel rim end and the wheel disc shoulder to form a butt joint. Alternately, the filler metal may be placed on the inside surface of the wheel rim end or on the wheel disc collar and the joint heated to form a lap joint between the wheel disc collar and the inside surface of the wheel rim end. Upon cooling, the soldering filler metal secures the wheel disc to the wheel rim while forming an air-tight seal therebetween to prevent loss of tire inflation air.

Following brazing, welding or soldering, an optional decorative finish, such as paint or a clear coating, can be applied to a portion of the wheel surface, such as the face of the wheel disc, as shown in functional block 81. Alternately, a decorative layer of metal plating can be deposited onto a portion of the wheel surface, however, such plating also is optional. Layers of plating are typically sealed with a layer of clear coat.

While the wheel fabrication process has been described above for vehicle wheels having multiple segmented beads cooperating with multiple segmented grooves to mechanically lock the wheel together, it will be appreciated that the process also can be applied to wheel discs and rims locked together with a single segmented bead and a complementary single segmented groove. Similarly, the process also can be practiced upon vehicle wheel components having beads formed on the wheel rim with corresponding groves formed in the wheel disc. As mentioned above, the process also can be used to provide a mechanical coupling between a wheel disc or spider which is disposed within a full wheel rim. In such an application, an air-tight seal is not needed and one or more spot welds can be used in functional block 80 instead of a continuous circumferential weld.

As described above, in the preferred embodiment, the wheel disc provided in functional block 70 can receive a decorative finish in functional block 71, such as painting or plating, before being attached to the wheel rim. Similarly, the wheel rim provided in functional block 73 can receive a decorative finish in functional block 74. In prior art wheel fabrication processes which include welding wheel discs having plated or painted finishes, such decorative finishes could be damaged by the heat generated when the wheel rim is welded to the wheel disc. Accordingly, in such prior art processes, the painting or plating is typically applied to the wheel after welding which requires a more complex manufacturing process. Thus, the present invention simplifies the manufacture of two piece wheels because the decorative finishes can be applied to the wheel components before they are assembled. Because the coating is not damaged during assembly, corrosion protection provided thereby is maintained.

Additionally, in the prior art processes, if there is a blemish in the decorative finish, the entire wheel has to be scrapped. With the present invention, any wheel discs or rims which have unsatisfactory finishes can be rejected before assembly of the wheel. This eliminates needless scraping of unblemished components and reduces the total scrap rate. Also, oxidation of the wheel disc and rim surfaces does not affect the air-tight seal formed therebetween.

Use of an adhesive instead of welding to bond together the wheel components eliminates welding heat and fumes during fabrication of the wheel. This simplifies the wheel manufacturing facility since heat and fume removal equipment are not required.

It will be appreciated that, while the preferred embodiment has been described as having a resilient material which includes an adhesive disposed between the wheel rim and wheel disc, the invention also can be practiced with only an adhesive disposed between the wheel rim and wheel disc.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle wheel comprising:
an annular wheel rim having an outboard end, said outboard end defining a cylindrical inner surface;
a circular wheel disc which extends radially across said outboard end of said wheel rim, said wheel disc having a central hub connected by a plurality of spokes to an annular-shaped sidewall, said sidewall including an uninterrupted cylindrical collar having an outer periphery which defines a first diameter, said collar extending axially into said wheel rim outboard end with said outer periphery adjacent to said cylindrical inner surface; and
a coupling to secure said wheel rim to said wheel disc, said coupling including at least one segmented bead formed on said wheel rim cylindrical inner surface and at least one segmented groove which is complementary to said segmented bead formed in said outer periphery of said wheel disc collar, said groove segment being formed separately from said bead segment and defining a second diameter which is less than said first diameter, said groove segment receiving said bead segment and cooperating therewith to retain said wheel disc collar within said wheel rim with said bead segment and said groove segment having sufficient circumferential length to prevent axial movement of said wheel rim relative to said wheel disc.

2. A vehicle wheel as described in claim 1 wherein said coupling includes a plurality segmented beads formed on said wheel rim cylindrical inner surface, said segmented beads defining at least two parallel planes, and a plurality of parallel segmented grooves formed in said outer periphery of said wheel disc collar, said segmented grooves being complementary to said segmented beads, said groove segments receiving said bead segments and cooperating therewith to retain said wheel disc collar within said wheel rim.

3. A vehicle wheel comprising:
an annular wheel rim having an outboard end, said outboard end defining a cylindrical inner surface;
a circular wheel disc which extends radially across said outboard end of said wheel rim, said wheel disc having a central hub connected by a plurality of spokes to an annular-shaped sidewall, said sidewall including an uninterrupted cylindrical collar having an outer periphery which defines a first diameter, said collar extending axially into said wheel rim outboard end with said outer periphery adjacent to said cylindrical inner surface; and
a coupling to secure said wheel rim to said wheel disc, said coupling including a plurality of parallel segmented beads formed on said wheel rim cylindrical inner surface, and a plurality of parallel segmented grooves formed in said outer periphery of said wheel disc collar, said segmented grooves being complementary to said segmented beads, said segmented grooves being formed separately from said segmented beads and defining a second diameter which is less than said first diameter, said segmented beads and grooves defining a plurality of parallel planes and said segmented beads in at least one of said parallel planes being staggered relative to said segmented beads in said other parallel planes, said segmented grooves receiving said segmented beads and cooperating therewith to retain said wheel disc collar within said wheel rim.

4. A vehicle wheel as described in claim 3 further including a resilient material disposed between said cylindrical wheel rim inner surface and said wheel disc collar.

5. A vehicle wheel as described in claim 4 wherein said resilient material includes an adhesive.

6. A vehicle wheel as described in claim 5 wherein said adhesive is selected from the group consisting of epoxies, acrylics and bisphenols.

7. A vehicle wheel as described in claim 5 wherein said wheel rim is a partial wheel rim and said wheel disc is a full face wheel disc and further wherein said resilient material forms an air-tight seal between said wheel disc and rim cylindrical surfaces.

8. A vehicle wheel as described in claim 3 wherein said wheel disc is brazed to said wheel rim.

9. A vehicle wheel as described in claim 3 wherein said wheel disc is welded to said wheel rim.

10. A vehicle wheel as described in claim 9 wherein said wheel rim is a partial wheel rim and said wheel disc is a full face wheel disc and further wherein said weld is a continuous air-tight circumferential weld formed between said wheel disc and said wheel rim.

11. A vehicle wheel as described in claim 3 wherein said wheel disc is soldered to said wheel rim.

12. A vehicle wheel comprising:
an annular wheel rim having an outboard end, said outboard end defining an uninterrupted cylindrical inner surface, said inner surface defining a first diameter;
a circular wheel disc which extends radially across said outboard end of said wheel rim, said wheel disc having a central hub connected by a plurality of spokes to an annular-shaped sidewall, said sidewall including a cylindrical collar having an outer periphery which extends axially into said wheel rim outboard end with said outer periphery adjacent to said cylindrical inner surface; and a coupling to secure said wheel rim to said wheel disc, said coupling including at least one segmented bead formed on said outer periphery of said wheel disc collar and at least one segmented groove which is complementary to said segmented bead formed in said cylindrical inner surface of said wheel rim outboard end, said groove segment being formed separately from said bead segment and defining a second diameter which is greater than said first diameter, said groove segment receiving said bead segment and cooperating therewith to retain said wheel disc collar within said wheel rim with said bead segment and said groove segment having sufficient circumferential length to prevent axial movement of said wheel rim relative to said wheel disc.

13. A vehicle wheel as described in claim 12 wherein said coupling includes a plurality of segmented beads formed on said wheel disc collar, said segmented beads defining at least two parallel planes, and a plurality of parallel segmented grooves formed in said wheel rim cylindrical surface, said segmented grooves being complementary to said segmented beads, said groove segments receiving said bead segments and cooperating therewith to retain said wheel disc within said wheel rim.

14. A vehicle wheel comprising:

an annular wheel rim having an outboard end, said outboard end defining an uninterrupted cylindrical inner surface, said inner surface defining a first diameter;

a circular wheel disc which extends radially across said outboard end of said wheel rim, said wheel disc having a central hub connected by a plurality of spokes to an annular-shaped sidewall, said sidewall including a cylindrical collar having an outer periphery which extends axially into said wheel rim outboard end with said outer periphery adjacent to said cylindrical inner surface; and a coupling to secure said wheel rim to said wheel disc, said coupling including a plurality of parallel segmented beads formed on said outer periphery of said wheel disc collar and a plurality of parallel segmented grooves formed in said cylindrical inner surface of said wheel rim outboard end, said segmented grooves being complementary to said segmented beads, said segmented grooves being formed separately from said segmented beads and defining a second diameter which is greater than said first diameter, said segmented beads and grooves defining a plurality of parallel planes and said segmented beads in at least one of said parallel planes being staggered relative to said segmented beads in said other parallel planes, said segmented grooves receiving said segmented beads and cooperating therewith to retain said wheel disc within said wheel rim.

15. A vehicle wheel as described in claim 14 further including a resilient material disposed between said cylindrical wheel rim surface and wheel disc collar.

16. A vehicle wheel as described in claim 15 wherein said resilient material includes an adhesive.

17. A vehicle wheel as described in claim 16 wherein said adhesive is selected from the group consisting of epoxies, acrylics and bisphenols.

18. A vehicle wheel as described in claim 16 wherein said wheel rim is a partial wheel rim and said wheel disc is a full face wheel disc and further wherein said resilient material forms an air-tight seal between said wheel disc and rim cylindrical surfaces.

19. A vehicle wheel as described in claim 14 wherein said wheel disc is brazed to said wheel rim.

20. A vehicle wheel as described in claim 14 wherein said wheel disc is welded to said wheel rim.

21. A vehicle wheel as described in claim 20 wherein said wheel rim is a partial wheel rim and said wheel disc is a fill face wheel disc and further wherein said weld is a continuous air-tight circumferential weld formed between said wheel disc and said wheel rim.

22. A vehicle wheel as described in claim 14 wherein said wheel disc is soldered to said wheel rim.

23. A vehicle wheel comprising:

an annular wheel rim having an outboard end, said outboard end defining a cylindrical inner surface;

a circular wheel disc which extends radially across said outboard end of said wheel rim, said wheel disc having a central hub connected by a plurality of spokes to an annular-shaped sidewall, said sidewall including an uninterrupted cylindrical collar having an outer periphery which defines a first diameter, said collar extending axially into said wheel rim outboard end with said outer periphery adjacent to said cylindrical inner surface; and a coupling to secure said wheel rim to said wheel disc, said coupling being free of welds and including at least one segmented bead formed on said wheel rim cylindrical inner surface and at least one segmented groove which is complementary to said segmented bead formed in said outer periphery of said wheel disc collar, said groove segment being formed separately from said bead segment and defining a second diameter which is less than said first diameter, said groove segment receiving said bead segment and cooperating therewith to retain said wheel disc collar within said wheel rim with said bead segment and said groove segment having sufficient circumferential length to prevent axial movement of said wheel rim relative to said wheel disc.

24. A vehicle wheel comprising:

an annular wheel rim having an outboard end, said outboard end defining an uninterrupted cylindrical inner surface, said inner surface defining a first diameter;

a circular wheel disc which extends radially across said outboard end of said wheel rim, said wheel disc having a central hub connected by a plurality of spokes to an annular-shaped sidewall, said sidewall including a cylindrical collar having an outer periphery which extends axially into said wheel rim outboard end with said outer periphery adjacent to said cylindrical inner surface; and a coupling to secure said wheel rim to said wheel disc, said coupling being free of welds and including at least one segmented bead formed on said outer periphery of said wheel disc collar and at least one segmented groove which is complementary to said segmented bead formed in said cylindrical inner surface of said wheel rim outboard end, said groove segment being formed separately from said bead segment and defining a second diameter which is greater than said first diameter, said groove segment receiving said bead segment and cooperating therewith to retain said wheel disc collar within said wheel rim with said bead segment and said groove segment having sufficient circumferential length to prevent axial movement of said wheel rim relative to said wheel disc.

* * * * *